US008144342B2

(12) United States Patent
Munoz-Bustamante

(10) Patent No.: US 8,144,342 B2
(45) Date of Patent: Mar. 27, 2012

(54) PRINT JOB SEPARATION APPARATUS AND METHOD

(75) Inventor: Carlos Munoz-Bustamante, Durham, NC (US)

(73) Assignee: Lenovo (Singapore) Pte. Ltd., Tech Park (SG)

( * ) Notice: Subject to any disclaimer, the term of this patent is extended or adjusted under 35 U.S.C. 154(b) by 1084 days.

(21) Appl. No.: 12/028,599

(22) Filed: Feb. 8, 2008

(65) Prior Publication Data

US 2009/0201530 A1 Aug. 13, 2009

(51) Int. Cl.
*G06F 15/00* (2006.01)
*B65H 3/52* (2006.01)

(52) U.S. Cl. ....................................... 358/1.12; 271/125

(58) Field of Classification Search ................. 358/1.12, 358/1.13, 1.16, 1.14, 1.18, 1.15, 1.1, 498; 271/125, 121, 303, 256, 9.01, 119, 10.11, 271/270; 399/328, 333

See application file for complete search history.

(56) References Cited

U.S. PATENT DOCUMENTS

| | | | | |
|---|---|---|---|---|
| 5,630,583 | A * | 5/1997 | Yergenson | 271/119 |
| 6,565,079 | B1 * | 5/2003 | Kakegawa et al. | 271/125 |
| 7,102,800 | B2 * | 9/2006 | Tuchtenhagen | 358/498 |
| 7,151,615 | B2 * | 12/2006 | Mantell | 358/1.15 |
| 2002/0093135 | A1 * | 7/2002 | Fetherolf et al. | 271/303 |
| 2006/0067750 | A1 * | 3/2006 | Inoue et al. | 399/328 |

* cited by examiner

*Primary Examiner* — Saeid Ebrahimi Dehkordy

(74) *Attorney, Agent, or Firm* — Kunzler Needham Massey & Thorpe

(57) ABSTRACT

An apparatus and method are disclosed for separating print jobs. Print jobs may be separated by alternating between outputting entire print jobs in straight and askew orientations. Print jobs may also be separated by outputting jobs in a straight orientation and outputting a separator page between each print job in an askew orientation. In one embodiment, separator pages may be input from a specified input tray that may contain sheets of a different color than that used for print jobs.

23 Claims, 6 Drawing Sheets

PRINT JOB SEPARATION APPARATUS AND METHOD

BACKGROUND OF THE INVENTION

1. Field of the Invention

This invention relates to printing and more particularly relates to separating print jobs.

2. Description of the Related Art

Printing devices, such as computer printers, fax machines, copiers, or multi-function devices, typically output all print jobs into a single output tray. Some devices use multiple output trays to separate print jobs, but this capability increases the cost of the devices considerably. When all print jobs are output in the same orientation into a single output tray, separating print jobs may involve paging through a large stack of papers. In the process, pages from print jobs may become lost, decollated, or mixed into other print jobs.

SUMMARY OF THE INVENTION

The present invention has been developed in response to the present state of the art, and in particular, in response to the problems and needs in the art that have not yet been fully solved by currently available printing devices and methods. Accordingly, the present invention has been developed to provide an apparatus and method for separating print jobs that overcome many or all of the above-discussed shortcomings in the art.

One apparatus disclosed herein includes, in certain embodiments, a print controller that receives print jobs, and a print engine that receives sheets from one or more input trays, prints the print job on the sheets, and then outputs the sheets in either a straight or askew orientation. In certain embodiments, the apparatus may output a separator sheet in an askew orientation between print jobs output in a straight orientation or alternate entire print jobs between straight and askew orientations.

One method disclosed herein includes, in certain embodiments, receiving print jobs, printing the print jobs on sheets received from an input receptacle, outputting the sheets to an output area, and outputting a selected sheet into the output area in an askew orientation. In some embodiments, entire print jobs may be output alternating between straight and askew orientations.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
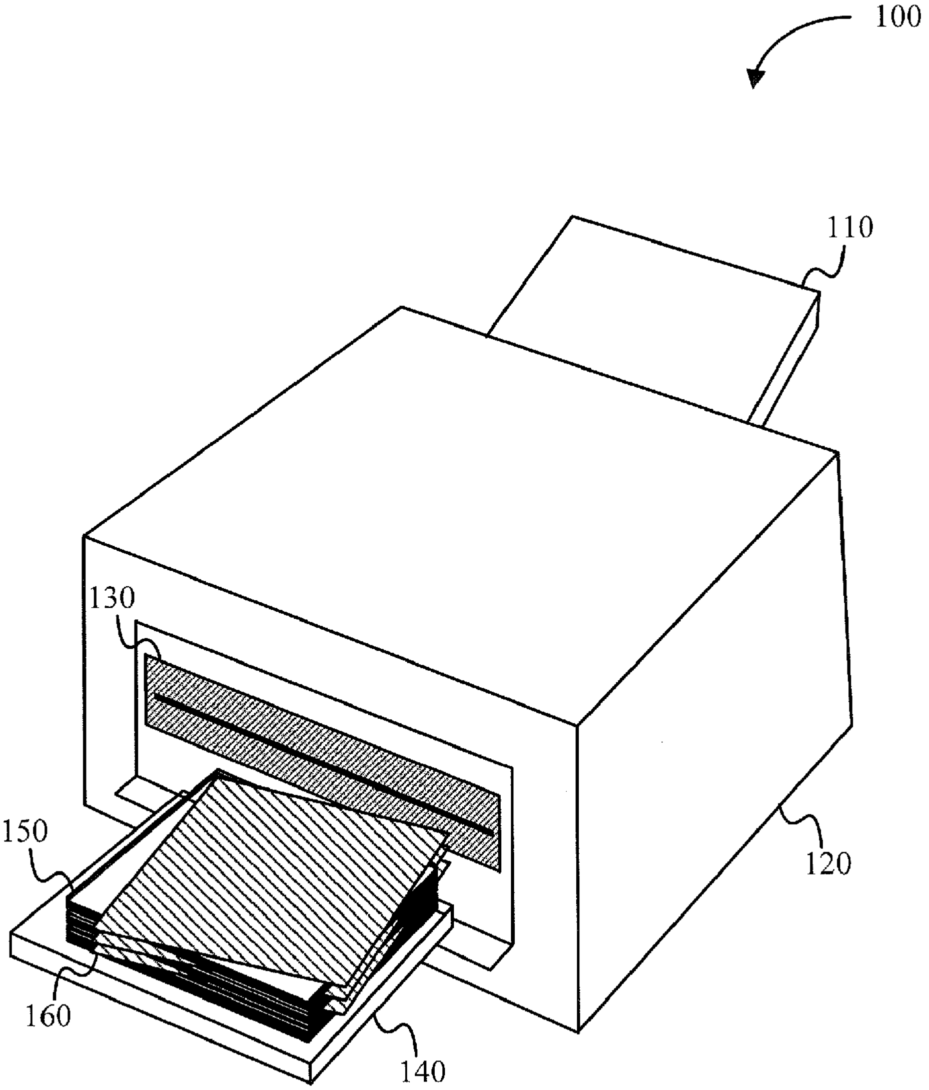
FIG. 1 is a perspective view diagram illustrating one embodiment of a printing apparatus in accordance with the present invention.

Some of the functional units described in this specification have been labeled as modules, in order to more particularly emphasize their implementation independence, while others are assumed to be modules. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

FIG. 1 is a perspective view diagram illustrating one embodiment of a printing apparatus 100 in accordance with the present invention. As depicted the printing apparatus 100 includes a sheet input receptacle 110, a printer enclosure 120, an orientation selector 130, and a sheet output receptacle 140. The printing apparatus 100 facilitates separating print jobs by outputting pages in a straight orientation 150 or in an askew orientation 160.

The printing apparatus 100 may be a printer, a fax machine, a copier, or a combination thereof. A print engine (not shown) or similar collection of printer components within the printer enclosure 120 receives sheets from the sheet input receptacle 110, prints upon the sheets, and then outputs the sheets to the sheet output area 140 via the orientation selector 130. The printer enclosure 120 and/or the print engine may contain a variety of printer components such as print heads, drums, rollers, page handling components, guides, wheels, and the like, that enable the printing apparatus 100 to print upon paper or other media and provide the paper to the orientation selector 130.

The orientation selector 130 controls the orientation of sheets output to the sheet output area 140. In one embodiment, the orientation selector 130 separates print jobs by outputting each print job in a straight orientation 150, followed by a separator sheet in an askew orientation 160. The orientation selector 130 may be integrated into the print engine and controlled by a print controller (not shown). The print controller may be partially or wholly integrated into the printing apparatus or a host computer. The orientation selector 130 may be configured from a control panel on the printer enclosure 120, via configuration software executing on the host computer, or from other configuration mechanisms known to those of skill in the art.

Figure 2:
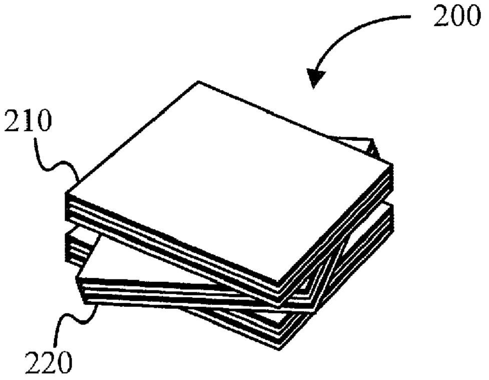
FIG. 2 is a perspective view diagram illustrating one embodiment of separated print jobs in accordance with the present invention.

FIG. 2 is a perspective view diagram illustrating one embodiment of separated print jobs 200 in accordance with the present invention. The separated print jobs 200 include print jobs output in a straight orientation 210, and print jobs output in an askew orientation 220. The separated print jobs 200 facilitate print job separation by alternating between a straight orientation 210 and an askew orientation 220.

In certain embodiments, the print controller and/or the orientation selector 130 may be configured to separate print jobs either by outputting jobs in a straight orientation 140 interspersed with separator sheets in an askew orientation 150, or by alternately print jobs between the straight orientation 210 and an askew orientation 220. When the printer workload is characterized by many small print jobs, alternating between outputting print jobs in a straight orientation 210 and an askew orientation 220 eliminates the need for separator sheets 150, which may result in a significant reduction in paper usage.

Figure 3:
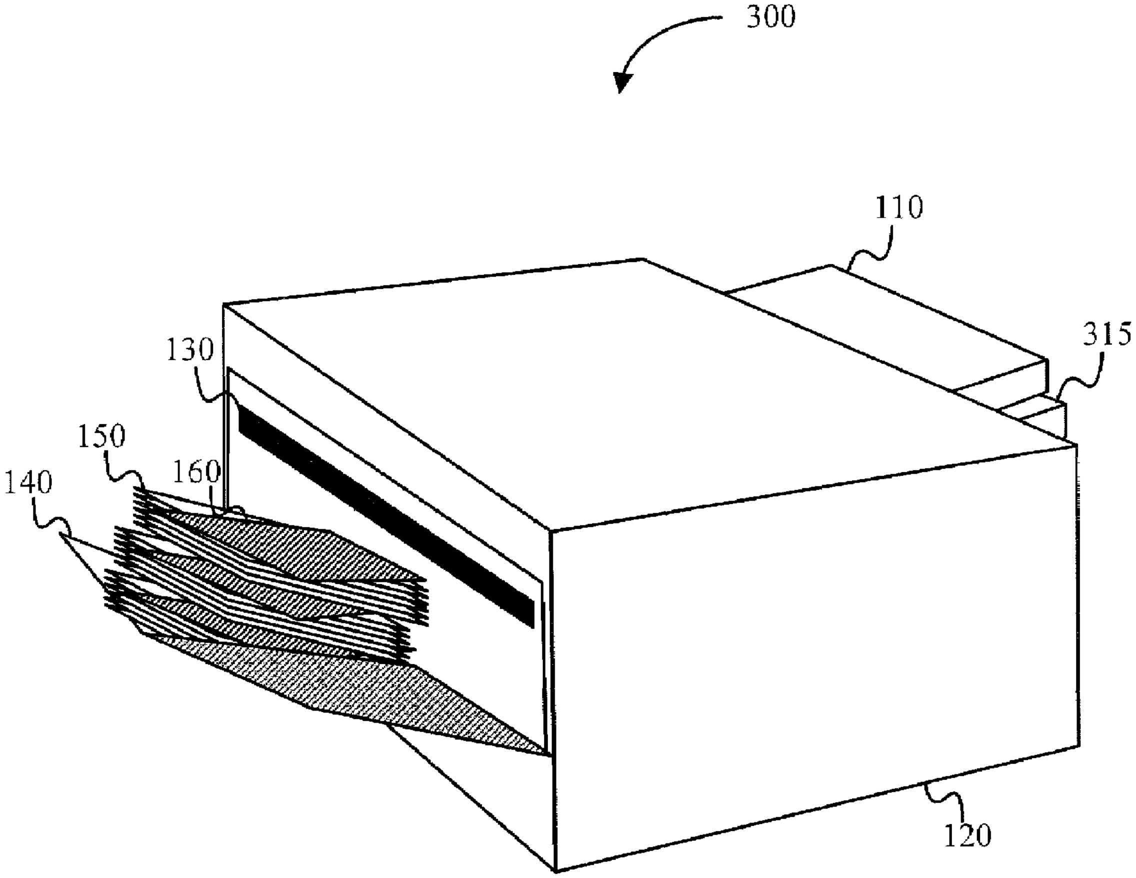
FIG. 3 is a perspective view diagram illustrating components of another embodiment of a printing apparatus in accordance with the present invention.

FIG. 3 is a perspective view diagram illustrating components of an alternative embodiment 300 of a printing apparatus in accordance with the present invention. The printing apparatus 300 may include various components of the printing apparatus 100 illustrated in FIG. 1, as well as a separator sheet input receptacle 315. The printing apparatus 300 facilitates separating print jobs by outputting separator sheets at an askew orientation 150 that may be a different color than that of the sheets used for print jobs output at a straight orientation 140.

The separator sheet input receptacle 315 may contain sheets of a different color than that of sheets in the sheet input receptacle 110. The print engine (not shown) within the enclosure 120 may be configured to receive sheets of one color from the sheet input receptacle 110 to output print jobs at a straight orientation 140, and separator sheets of a different color from the separator sheet input receptacle 315 to output separator sheets of a different color at an askew orientation 150. In one embodiment, the separator sheet input receptacle 315 may contain sheets the same color as the sheet input receptacle 110 in order to provide additional sheet input capacity. The orientation selector 130 may then be configured to output print jobs in a straight orientation 150 and separator sheets of the same color at an askew orientation 160, as depicted in FIG. 1, or alternate between outputting print jobs in a straight orientation 210 and an askew orientation 220, as depicted in FIG. 2.

Figure 4:
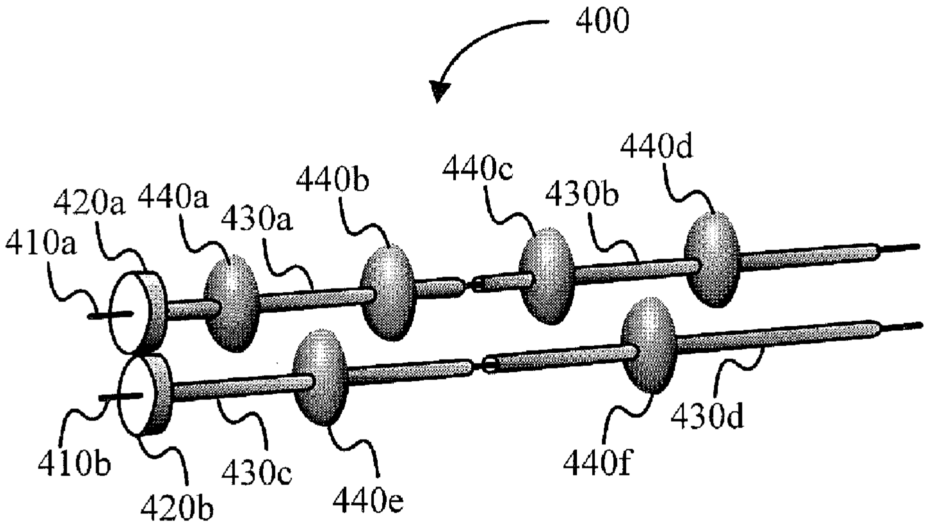
FIGS. 4 and 5 are perspective view diagrams illustrating components of one embodiment of a page handler in accordance with the present invention.

FIG. 4 is a perspective view diagram illustrating components of one embodiment of a page handler 400 in accordance with the present invention. As depicted, the page handler 400 is one embodiment of the orientation selector 130 illustrated in FIG. 1. The depicted embodiment of the page handler 400 includes axles 410*a* and 410*b*, braking wheels 420*a* and 420*b*, axle sleeves 430*a-d*, and feed rollers 440*a-f*. The page handler 400 facilitates separating print jobs by altering the orientation of selected pages.

In the depicted embodiment, the braking wheel 420*a*, axle sleeve 430*a* and feed rollers 440*a* and 440*b* are joined and turn together on the axle 410*a*. The braking wheel 420*a*, axle sleeve 430*a* and feed roller 440*a* may be friction fit to the axle 410*a*, such that when a brake is applied to the braking wheel 410*a*, their rotation can be slowed or stopped. Similarly, the braking wheel 420*b*, axle sleeve 430*c*, and feed roller 440*e* may be joined and friction fit to the axle 410*b*. In one embodiment, the braking wheels 420 and corresponding axle sleeves are integrally formed into one or more braking rollers.

The components on the right sides of the axles 410*a* and 410*b*, namely the feed rollers 440*c*, 440*d* and 440*f*, and the axle sleeves 430*b* and 430*d* may be fixed to the axles 410*a* and 410*b*, or may be joined together and friction fit to the axles 410*a* and 410*b* in a similar fashion to the components on the left side of the axles 410*a* and 410*b*. The depicted feed rollers 440 are non-contact rollers that are laterally offset from one another. The perimeters of the feed rollers 440 may overlap and be made of a material that is highly pliable or compressible in order to provide a relatively broad contact area between the rollers and a wide variety of printed media. By applying a brake to the braking wheels 420*a* and 420*b* as a sheet passes through the page handler 400, the left side of the sheet (in the depicted arrangement) can be slowed slightly, resulting in the sheet being output askew.

Figure 5:
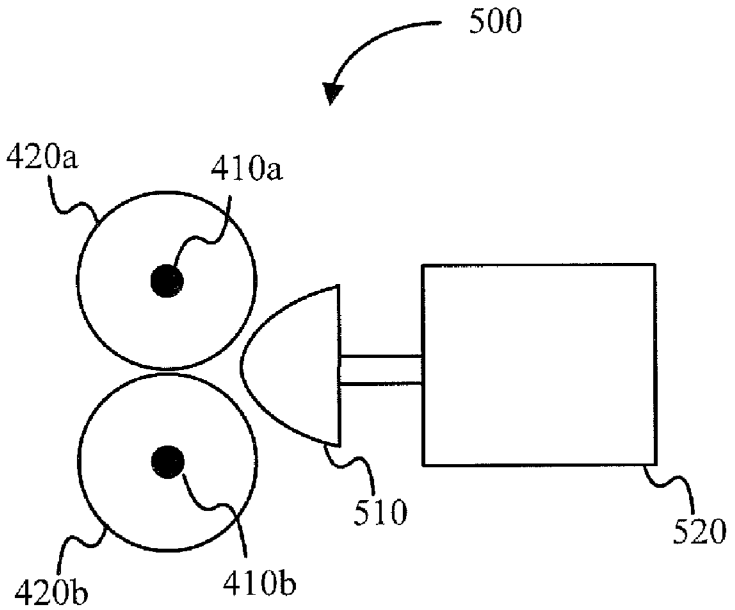

FIG. 5 is a perspective view diagram illustrating additional components of one embodiment of the page handler 400 in accordance with the present invention. The components 500 include the braking wheels 420*a* and 420*b* illustrated in FIG. 4, as well as a brake 510 and an actuator 520. The brake 510 and actuator 520 facilitate separating print jobs by slowing the output of one side of sheets in order to alter the orientation of selected pages. The brake 510 and actuator 520 may be integrated into the orientation selector 130 or the like.

In the depicted embodiment, the actuator 520 engages the brake 510 against the braking wheels 420*a* and 420*b* to slow the turning of components on the left side of the axles 410*a* and 410*b*. In one embodiment, the actuator applies the brake 510 to the braking wheels 410*a* and 410*b* in a series of brief pulses to slow output of the left side of the sheet, such that the sheet is output in an askew orientation. The pulsed action of the brake 510 against the braking wheels 420*a* and 420*b* may simulate a smooth braking action on the feed rollers 440 on one side of the axles 410*a* and 410*b*.

The actuator 520 may be configured to reduce an output rate for one side of the sheet proportionate to the output rate required to achieve a selected skew angle. In certain embodiments, the reduction in output rate may occur as the trailing edge of the sheet passes through the rollers. However, the pulsing may begin as early as when the trailing edge exits a penultimate set of rollers, drum, or similar mechanism (none of which are shown). In one non-limiting example, the output of one side of an 8.5"×11" sheet may be reduced sufficiently to skew (i.e. rotate) the sheet such that at least one corner of the sheet will extend at least ½ inch from the sheets output in a straight orientation. Any amount of skew sufficient to cause the job or separator sheet to be visually conspicuous is contemplated by the embodiments. However, it may be preferable to rotate the sheets between about 2 and 30 degrees relative to the straight orientation.

Figure 6:
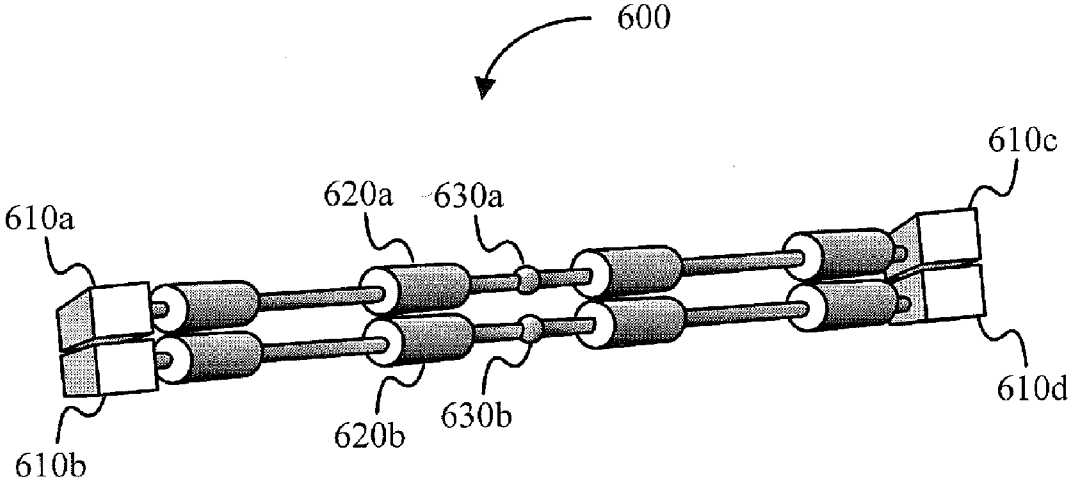
FIG. 6 is a perspective view diagram illustrating components of another embodiment of a page handler in accordance with the present invention.

FIG. 6 is a perspective view diagram illustrating components of an alternative embodiment 600 of a page handler in accordance with the present invention. In the depicted embodiment, the page handler 600 includes stepper motors 610*a-d*, pinch feed rollers 620*a* and 620*b*, and bearings 630*a* and 630*b*. The page handler 600 facilitates separating print jobs by slowing the output of one side of sheets to alter the orientation of print jobs and separator pages.

In the depicted embodiment, the stepper motors 610*a* and 610*b* on one end of the page handler 600 may selectively output sheets at a slower rate than the stepper motors 610*c* and 610*d* on the opposite end of the page handler 600. In another embodiment, the stepper motors 610*b* and 610*d* are replaced with passive bearings. The bearings 630*a* and 630*b* allow the pinch feed rollers 620*a* and 620*b* at each end of the page handler 600 to turn at different rates, thus facilitating sheets to be output at either straight or askew orientation. One of skill in the art will recognize that the page handler 600 may be embodied using various components, such as a clutch, variable speed transmission, or variable radius rollers to selectively output sheets at a straight or an askew orientation.

The schematic flow chart diagram that follows is generally set forth as a logical flow chart diagram. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 7:
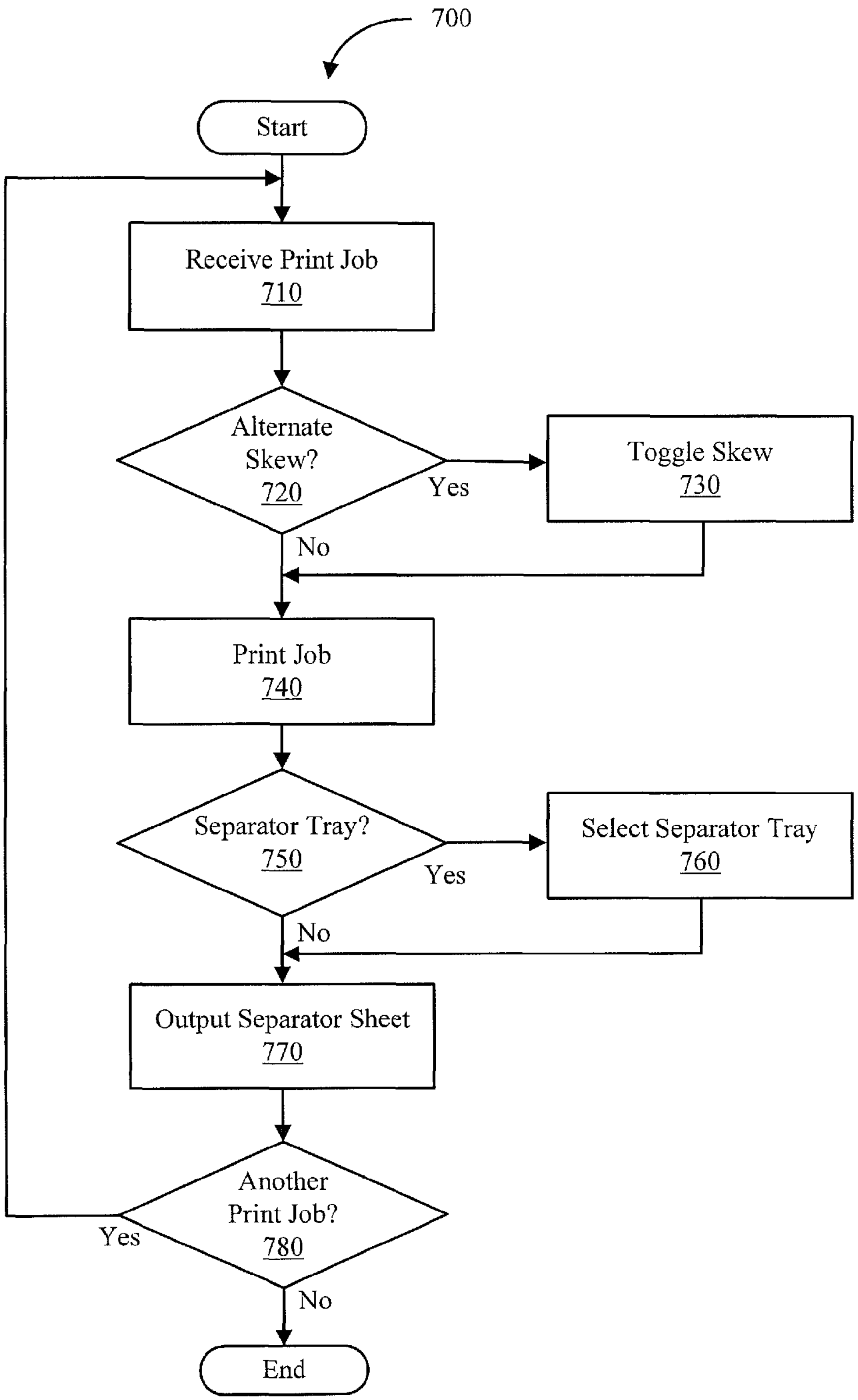
FIG. 7 is a schematic flow chart diagram illustrating one embodiment of a method for separating print jobs in accordance with the present invention.

FIG. 7 is a schematic flow chart diagram illustrating one embodiment of a print job separation method 700 in accordance with the present invention. The depicted embodiment of the print job separation method 700 includes a receive print job operation 710, an alternate skew test 720, a toggle skew operation 730, a print job operation 740, a separator tray test 750, a select separator tray operation 760, an output separator sheet operation 770, and an another print job test 780. The print job separation method may be conducted by a printing device, a print controller, a print engine, a host computer, or the like. The print job separation method 700 facilitates print job separation.

The receive print job operation 710 receives a print job. In various embodiments, the receive print job operation 710 may include receiving a stream of text; page description language (PDL) directives, such as PostScript directives, printer control language (PCL) directives or portable document format (PDF) directives; images in any of the many graphic image formats, such as JPEG or vector graphic images; or document facsimile (fax) images. Print jobs may be received from a computer connected to the print engine directly by a cable or wireless connection, or via a network, or by scanning a document directly using digital or photographic processes.

The alternate skew test 720 determines whether the print engine is configured to output a separator sheet between print jobs or to alternate outputting print jobs between a straight and an askew orientation. The alternate skew test 720 and the accompanying toggle skew operation 730 may be performed either before or after the print job operation 740. The print job separation mode may be configured on a control panel on the print engine or may be set by a printer control directive received from a computing device attached by a cable or wireless connection, or via a network. If the print job is to be output in alternating straight and askew orientations, the print job separation method 700 continues with the toggle skew operation 730. Otherwise, the print job separation method 700 continues with the print job operation 740.

In one embodiment, the toggle skew operation 730 determines whether the previous print job was output in a straight or askew orientation. If the previous print job was output in a straight orientation, the toggle skew operation 730 sets the orientation for the subsequent print job to askew orientation. If the previous print job was output in an askew orientation, the toggle skew operation 730 sets the orientation for the subsequent print job to straight orientation.

The print job operation 740 prints and outputs the print job in either a straight or askew orientation, as the print engine is configured. The print job may be printed using any of the printer technologies used to print on separate sheets, such as electrostatic (toner-based) printing, inkjet, solid ink, or dye-sublimation.

The separator tray test 750 determines whether the print engine is configured to input separator sheets from a specified input tray. Separator sheets may be of a different color than the sheets used for the print job to make the separator sheet more visible. If the print engine is configured to input separator sheets from a specified input tray, the print job separation method 700 continues with the select separator tray 760 operation. Otherwise, the print job separation method 700 continues with the output separator sheet operation 770.

The select separator tray operation 760 determines which input tray contains the sheets to be used as print job separator sheets. The separator sheet input tray may be configured on a control panel on the print engine or may be set by a printer control directive received from a computing device attached to the print engine by a cable or wireless connection, or via a network.

The output separator sheet operation 770 outputs a separator sheet in the configured orientation. In one embodiment, the print engine may be configured to output a separator sheet either in a straight or askew orientation. If the print engine is configured to output print jobs alternating in straight and askew orientation, the print engine may be configured to not output a separator sheet, to reduce waste.

The print job test 780 determines whether another print job is available for printing. If another print job is available, the print job separation method 700 continues with the receive print job operation 710. Otherwise, the print job separation method 700 ends.

Figure 8A:
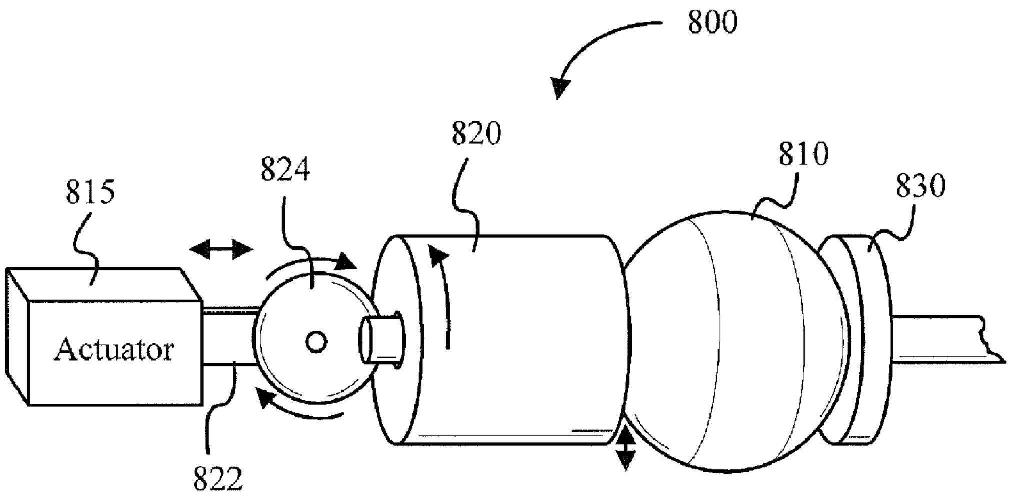
FIGS. 8*a* and 8*b* are perspective view diagrams illustrating components of one embodiment of a variable radius page handler in accordance with the present invention.
Figure 8B:
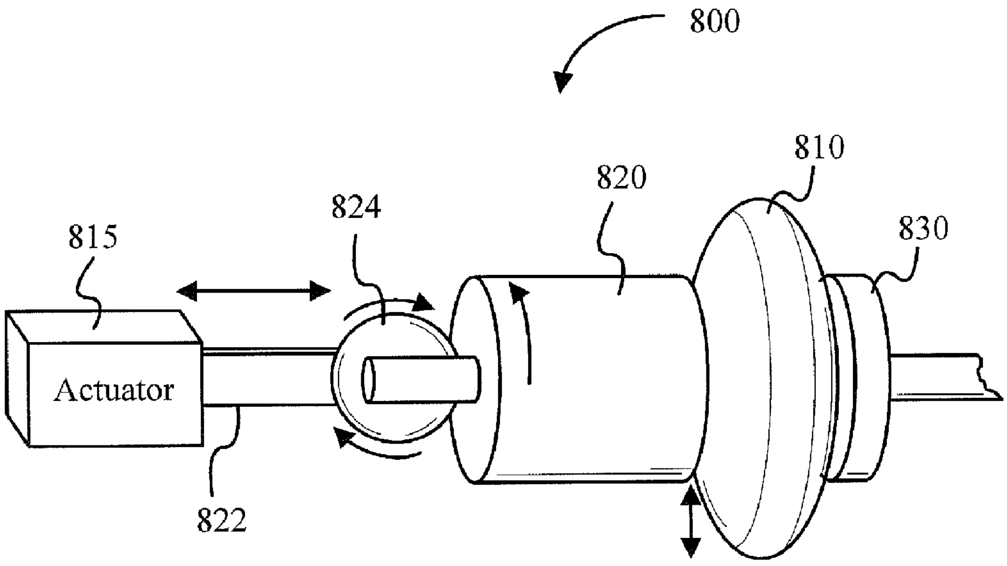

A variable radius page handler 800 shown in FIGS. 8*a* and 8*b* may be constructed by using a pliable material for one or more rollers 810. Such pliable material could be, for example, hollow air-filled rubber or foam rubber. An actuator 815 may be coupled to a movable cylinder 820 which may be mounted over one of the axles and which rests to one side of the pliable roller. In the depicted arrangement, the actuator is coupled to the movable cylinder 820 via an extension shaft 822 and a passive coupling roller 824.

A fixed plate 830 on the other side of the pliable roller from the actuator 815 may be used to oppose forces applied by the actuator 815 via passive coupling roller 824 and the movable cylinder 820. Actuation of the actuator 815 may reduce the distance between the movable cylinder and the fixed plate and thereby 'squeeze' the roller 810 into a shape of increased radius as shown in FIG. 8*b*. The increased radius, even to a single roller on one axle, when used in conjunction with non-contact rollers such as those shown in FIG. 4, may force an angular skew in the printed media due to an increase in linear rate at the roller interface. The angular skew may be produced by the page handler 800 even when all rollers turn at a constant angular rate. The page handler 800 may be integrated into an orientation selector 130 or the like.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:

a print controller configured to receive print jobs;

a print engine configured to receive sheets from a sheet input receptacle, print upon the sheets as directed by the print controller, and output the sheets in a straight orientation into a sheet output receptacle; and the print engine further configured to output a selected sheet into the sheet output receptacle in an askew orientation relative to the sheets in the straight orientation as directed by the print controller.

2. The apparatus of claim 1, wherein the selected sheet is a separator sheet for separating print jobs.

3. The apparatus of claim 2, further comprising another sheet input receptacle for providing separator sheets for separating print jobs.

4. The apparatus of claim 1, wherein the print controller is further configured to direct the print engine to output an entire print job in the askew orientation.

5. The apparatus of claim 4, wherein the print controller is further configured to alternate print jobs between the askew orientation and the straight orientation.

6. The apparatus of claim 1, wherein the print engine comprises a plurality of output rollers configured to rotate the selected sheet into the askew orientation.

7. The apparatus of claim 1, wherein the print engine is incorporated into a product selected from the group consisting of a printer, a fax machine, a copier, and a multi-function printer.

8. The apparatus of claim 1, wherein the askew orientation is rotated between 2 and 30 degrees relative to a straight orientation.

9. An apparatus comprising:

a printer component;

a plurality of rollers configured to output one or more sheets pertaining to a first print job from the printer component into a sheet output receptacle in a straight orientation; and an orientation selector configured to adjust a relative feed rate on the plurality of rollers and thereby output a sheet separate from the first print job into the sheet output receptacle in an askew orientation relative to the sheets in the straight orientation.

10. The apparatus of claim 9, wherein the orientation selector comprises a brake configured to reduce a feed rate on a selected roller of the plurality of rollers.

11. The apparatus of claim 9, wherein the orientation selector comprises a feed controller electrically connected to a plurality of feed motors.

12. The apparatus of claim 9, wherein the plurality of rollers comprise friction-fitted rollers.

13. The apparatus of claim 9, wherein the plurality of rollers comprise non-contact rollers.

14. The apparatus of claim 9, wherein the plurality of rollers comprise pinch rollers.

15. The apparatus of claim 9, wherein the askew orientation is rotated between 2 and 30 degrees relative to the straight orientation.

16. The apparatus of claim 9, wherein the orientation selector comprises a variable radius roller.

17. The apparatus of claim 16, further comprising an actuator coupled to the variable radius roller and configured to force the variable radius roller into a shape of increased radius.

18. A method comprising:

receiving a plurality of print jobs;

receiving sheets from a sheet input receptacle, printing upon the sheets according to the plurality of print jobs and outputting the sheets in a straight orientation into a sheet output receptacle; and outputting a selected sheet into the sheet output receptacle in an askew orientation relative to the sheets in the straight orientation into the sheet output receptacle.

19. The method of claim 18, wherein the selected sheet is a separator sheet for separating the print jobs.

20. The method of claim 18, further comprising outputting an entire print job in the askew orientation.

21. The method of claim 20, further comprising alternating print jobs between the askew orientation and a straight orientation.

22. An apparatus comprising:

a printer component;

a plurality of rollers for moving paper from the printer component, the plurality of rollers comprising a braking roller and at least one non-braking roller;

a brake wheel mechanically coupled to the braking roller; and a brake configured to contact the brake wheel and reduce a feed rate on the braking roller relative to the non-braking rollers.

23. The apparatus of claim 22, further comprising a housing for containing the printing component, the plurality of rollers, the brake wheel, and the brake.

* * * * *